Figure 1:
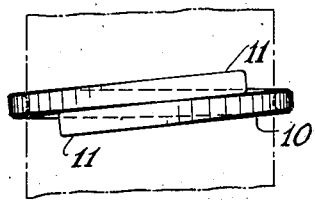

June 9, 1942.  W. L. WEEKS  2,285,850
SPRING RING HOSE CLAMP
Filed Aug. 28, 1940

INVENTOR
Walter L. Weeks.
BY
ATTORNEY

Patented June 9, 1942

2,285,850

UNITED STATES PATENT OFFICE 2,285,850

SPRING RING HOSE CLAMP

Walter L. Weeks, Glen Rock, N. J., assignor to Wright Aeronautical Corporation, a corporation of New York Application August 28, 1940, Serial No. 354,529

6 Claims. (Cl. 24—19)

This invention relates to hose clamps, being particularly concerned with improvements in spring hose clamps adapted to secure resilient hose of fairly large diameter to a tube or the like inserted within the hose hollow.

An object of the invention is to provide a spring clamp of a more or less familiar type but which incorporates improvements which render it much less liable to fracture than the clamps previously used.

A further object of the invention is to provide a spring hose clamp of great strength.

Still another object is to provide a spring hose clamp which may be readily applied to or removed from a hose by means of a simple plier tool.

Still another object is to provide alternative arrangements of the hose clamp of the invention adapted to be fabricated from round spring wire or from a flat spring strip.

Figure 4:
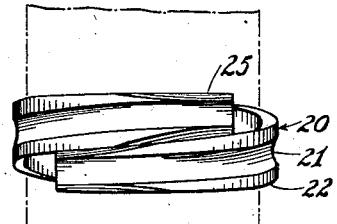
Figure 2:
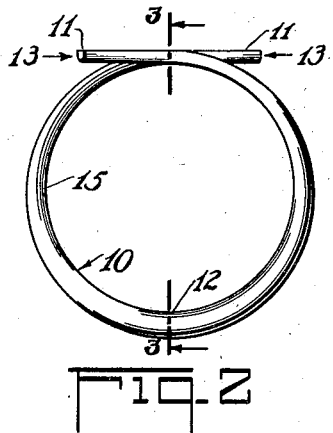
Figure 5:
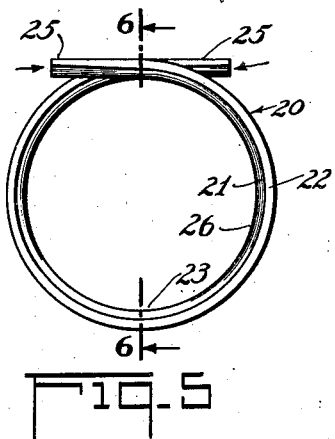
Figure 3:
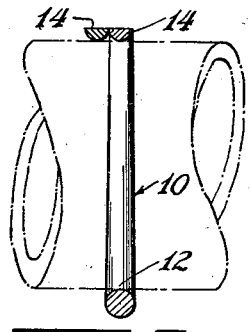
Figure 6:
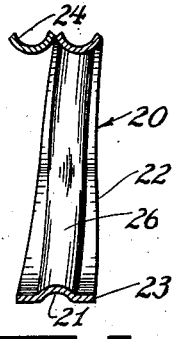

The details of the invention will be better understood by reading the description below in connection with the drawing, in which:

Fig. 1 is a top view of the clamp;
Fig. 2 is a side view of the clamp;
Fig. 3 is a section on the line 3—3 of Fig. 2;
Fig. 4 is a top view of an alternative embodiment;
Fig. 5 is a side view of the alternative embodiment;
Fig. 6 is a section on the line 6—6 of Fig. 5; and
Fig. 7 is a plan of the clamp of Figs. 4, 5, and 6 prior to final formation as a ring.

Referring first to Figs. 1, 2, and 3, the hose clamp 10 therein consists of a single turn of round spring wire of appropriate stiffness, the ends of the wire being extended tangentially of the ring as at 11 at a point where the single turn is completed, these tangential portions 11 being slightly angled with respect to one another, as shown in Fig. 1. One of the special features of the invention consists in tapering the cross section of the wire from a point 12 opposite to the ends 11, to said ends, whereby, when pressure is applied to the ends of the wire, as indicated by the arrows 13 in Fig. 2, the ring will be opened up for application to or removal from a section of hose without causing high stress at the point 12 due to the large bending moment thereat. To attain the tapered cross section of the ring, I prefer to start with a piece of straight round spring wire and, from the mid point thereof, I remove material from the center toward each end by grinding or other appropriate process, this tapering being accomplished so that the mid point of the wire is circular, as shown in Fig. 3 at 12, while the ends of the wire are substantially semi-circular in section, as shown at 14 in Fig. 3. Thereupon, I form the wire into the circlet shown in the drawing. It will be apparent that the bending deflections in the ring, and the wrapping effect of the ring, will be substantially uniform throughout which permits of ready expansion of the ring for removal or application without likelihood of breaking it due to high stress at the point 12 and further, the uniform tension on the hose afforded by the tapered ring, will make it more secure. It will be noted that the innermost part of the ring at 15 is of uniform circular section so that this portion of the ring will engage and deform the hose with which it is associated, the tapering of the ring being accomplished wholly on that side of the wire which is not in contact with the hose. The tapering of the ring, by flattening the portions of the outer surface thereof, is a very simple operation and one which would lend itself to production methods.

Figure 7:

In Figs. 4 to 7, I show an alternate arrangement of the hose clamp, Fig. 7 showing the blank which after fabrication is rolled into the ring form of Figs. 4 and 5. The blank consists of a strip of spring stock 20 which is formed with a central uniform corrugation 21 throughout its length, this corrugation being bordered by flanges 22 having their greatest width at the longitudinal center of the strip at 23. These flanges taper toward the ends so that they disappear, or are very narrow, at the strip ends 24. The strip then comprises a spring beam of substantially uniform strength throughout its length on the basis that the beam is supported at its ends and is loaded uniformly throughout its length. This blank, of Fig. 7, is then rolled into ring form with tangential end portions 25 projecting therefrom for contact by a plier tool by which the ring may be applied to or removed from a hose. The inner surface of the corrugation as indicated at 26, engages the elastic hose material to securely hold the clamp in place, while the tapered flange portions of the clamp serve to provide uniform wrapping action throughout the circumference of the clamp without likelihood of stress concentration at the mid point 23 of the clamp strip. It is deemed to be within the scope of the invention to taper the clamp blanks at a non-uniform rate from the center to the ends. The latter non-uniform taper might be preferred for the reason that, when the ends of the clamp are forced toward each other to open the clamp, the grip of the plier tool used is such that the ends move in a path which is not a path that will uniformly load the clamp in bending. Thus, the sections of the clamp from center to ends might have a taper, determined by experiment, which would allow for uniform stress throughout the length of the clamp to avoid likelihood of breakage at any particular zone in the clamp circumference.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A hose clamp comprising an elongated spring element tapered from is center toward its ends to comprise a beam of substantially uniform strength, said element comprising a circlet with straight end portions crossing one another and lying substantially tangent to the balance of the circlet.

2. A hose clamp comprising an initially round spring wire having tapered flats starting substantially from the middle of the wire and extending to the ends, the wire thus having a circular section at its middle and substantially semicircular sections at its ends, said wire comprising a circlet with the flats on the outside.

3. A hose clamp comprising an initially flat strip of spring metal having a longitudinal corrugation of uniform section and flanges bordering the corrugation, said flanges being wide at the middle of the strip and tapering so that they disappear at the ends, the strip comprising a circlet with the convex side of the corrugation facing inwardly.

4. A hose clamp comprising an open circlet of spring strip, said strip having an inwardly protruding corrugation throughout its circumference, the strip edges on each side of the corrugation being widest at a point diametrically opposite the circlet ends and tapering substantially to nil at the circlet ends.

5. A hose clamp comprising an open circlet of spring material, the material tapering substantially uniformly from maximum cross-sectional area at a point opposite the circlet opening to a lesser cross-sectional area adjacent the circlet opening.

6. A hose clamp comprising an open circlet of spring material, the material tapering substantially uniformly from maximum cross-sectional area at a point opposite the circlet opening to a lesser cross-sectional area adjacent the circlet opening, the material ends at the circlet opening crossing one another to comprise substantially straight portions tangent to the circlet adapted to be grasped by a plier tool for assembling or disassembling the clamp with respect to a hose.

WALTER L. WEEKS.